United States Patent
Cansizoglu et al.

(10) Patent No.: US 10,909,369 B2
(45) Date of Patent: Feb. 2, 2021

(54) IMAGING SYSTEM AND METHOD FOR OBJECT DETECTION AND LOCALIZATION

(71) Applicants: Mitsubishi Electric Research Laboratories, Inc., Cambridge, MA (US); Mitsubishi Electric Corporation, Tokyo (JP)

(72) Inventors: Esra Cansizoglu, Cambridge, MA (US); Wim Abbeloos, Hove (BE); Sergio Salvatore Caccamo, Stockholm (SE); Yuichi Taguchi, Cambridge, MA (US); Yukiyasu Domae, Tokyo (JP)

(73) Assignees: Mitsubishi Electric Research Laboratories, Inc, Cambridge, MA (US); Mitsubishi Electric Corporation, Tokyo (JP)

(*) Notice: Subject to any disclaimer, the term of this patent is extended or adjusted under 35 U.S.C. 154(b) by 289 days.

(21) Appl. No.: 15/790,355

(22) Filed: Oct. 23, 2017

(65) Prior Publication Data

US 2019/0019030 A1    Jan. 17, 2019

Related U.S. Application Data

(60) Provisional application No. 62/532,478, filed on Jul. 14, 2017.

(51) Int. Cl.
  *G06K 9/00* (2006.01)
  *G06K 9/62* (2006.01)
  (Continued)

(52) U.S. Cl.
  CPC ....... *G06K 9/00664* (2013.01); *G06K 9/4671* (2013.01); *G06K 9/6203* (2013.01);
  (Continued)

(58) Field of Classification Search
  None
  See application file for complete search history.

(56) References Cited

U.S. PATENT DOCUMENTS 7,412,427 B2    8/2008    Zitnick et al.
8,837,839 B1    9/2014    Huber et al.
(Continued)

OTHER PUBLICATIONS

A. Karpathy et al., "Object discovery in 3D scenes via shape analysis", International Conference on Robotics and Automation, 2013.
(Continued)

*Primary Examiner* — Nancy Bitar
(74) *Attorney, Agent, or Firm* — Gennadiy Vinokur; James McAleenan; Hironori Tsukamoto

(57) ABSTRACT

A method and system detects and localizes multiple instances of an object by first acquiring a frame of a three-dimensional (3D) scene with a sensor, and extracting features from the frame. The features are matched according to appearance similarity and triplets are formed among matching features. Based on 3D locations of the corresponding points in the matching triplets, a geometric transformation is computed. Matching triplets are clustered according to the computed geometric transformations. Since the set of features coining from two different object instances should have a single geometric transform, the output of clustering provides the features and poses of each object instance in the image.

18 Claims, 11 Drawing Sheets

(51) Int. Cl.
*G06K 9/46* (2006.01)
*G06T 7/73* (2017.01)
*G06T 1/00* (2006.01)

(52) U.S. Cl.
CPC .......... *G06K 9/6211* (2013.01); *G06K 9/6215* (2013.01); *G06K 9/6218* (2013.01); *G06T 7/75* (2017.01); *G06T 1/0014* (2013.01); *G06T 2207/10024* (2013.01); *G06T 2207/10028* (2013.01)

(56) References Cited

U.S. PATENT DOCUMENTS

| | | | |
|---|---|---|---|
| 9,269,020 | B2 | 2/2016 | Balestri et al. |
| 9,508,009 | B2 * | 11/2016 | Wnuk ................ G06K 9/00671 |
| 2012/0300020 | A1 * | 11/2012 | Arth ......................... G06T 7/75 348/36 |
| 2013/0336582 | A1 * | 12/2013 | Dai ...................... G06K 9/4652 382/165 |
| 2015/0016712 | A1 * | 1/2015 | Rhoads .............. G06K 9/00208 382/154 |
| 2016/0026847 | A1 * | 1/2016 | Vugdelija ............ G06K 9/6218 382/103 |
| 2016/0275686 | A1 * | 9/2016 | Zach ....................... G06K 9/52 |

OTHER PUBLICATIONS

E. Herbst et al., "RGB-D object discovery via multiscene analysis", International Conference on Intelligent Robots and Systems, 2011.

T. Leung et al., "Detecting, localizing and grouping repeated scene elements from an image" European Conference on Computer Vision, 2013.

M. Pauly et al., "Discovering structural regularity in 3d geometry", ACM Transactions on Graphics, 2008.

C. Wu et al., "Detecting large repetitive structures with salient boundaries", European Conference on Computer Vision, 2010.

* cited by examiner

| Object | Scene | GT | clustered | detected | total (%) | Model |
|---|---|---|---|---|---|---|
| crayola | 1 | 5 | 5 | 0 | 5 (100%) | Y |
|  | 2 | 5 | 4 | 0 | 0 (0%) | N |
|  | 3 | 5 | 5 | 0 | 5 (100%) | Y |
|  | 4 | 4 | 4 | 0 | 4 (100%) | Y |
| book | 1 | 5 | 5 | 0 | 5 (100%) | Y |
|  | 2 | 5 | 5 | 0 | 5 (100%) | Y |
|  | 3 | 4 | 4 | 0 | 0 (0%) | N |
|  | 4 | 5 | 5 | 0 | 5 (100%) | Y |
| duck | 1 | 4 | 4 | 0 | 4 (100%) | Y |
|  | 2 | 4 | 3 | 1 | 4 (100%) | Y |
|  | 3 | 4 | 2 | 0 | 2 (50%) | Y |
|  | 4 | 4 | 3 | 1 | 4 (100%) | Y |
| brush | 1 | 2 | 2 | 0 | 2 (100%) | Y |
|  | 2 | 3 | 2 | 1 | 3 (100%) | Y |
|  | 3 | 3 | 3 | 0 | 3 (100%) | Y |
|  | 4 | 3 | 2 | 0 | 2 (66%) | Y |

FIG. 9

IMAGING SYSTEM AND METHOD FOR OBJECT DETECTION AND LOCALIZATION

FIELD OF THE INVENTION

This invention relates to object detection and localization and more particularly to an imaging system and a method for determining a pose of an object in a scene from an image of the scene.

BACKGROUND OF THE INVENTION

Accurate detection and localization of objects in a cluttered natural scene remains one of the most difficult problems faced by the field of computer vision. The primary issue is that the same object appears differently to a viewer depending on the viewing angle (azimuth and elevation), the distance of the viewer (which affects the perceived size of the object, that is its scale), and whether it is partially occluded by other objects (and the degree of this occlusion). Human perception solves these problems with a minimum of effort. Based on a number of training views, an imaging system can also learn enough about an object to localize the object in each of these scenarios.

However, literally millions of objects exist, and finding a computationally feasible method for detecting and localizing a particular object can be difficult. Some conventional methods use feature-based techniques that extract local feature descriptors from salient points in an image. The object detection and localization is achieved by matching feature descriptors from a query image with those found from a set of training images.

For example, U.S. Pat. No. 7,412,427 describes a method of object detection and localization by comparing feature symbol triplets in an image with feature symbol triplets from training images. Similarly, the method described in U.S. Pat. No. 8,837,839 detects the object in an image including multiple object instances by comparing the image with the training images from the training dataset.

The computerized object detection and localization problem also shares the problem of maintaining a reasonably sized database that acts as memory of trained objects. One must represent the training object in a minimalist way to provide adequate speed, but must also capture enough information to retain recognition accuracy. However, maintaining the training database can be a tedious task. For example, an introduction of a new product to the supermarket shelf may require updating the training database with the training images of the new product. Similarly, removal and/or update of the packaging of the product from the product line may necessitate the update of the training database as well. In addition, such a training database is usually remote, and querying the training database with the input images can consume important memory, computation, and network resources.

Accordingly, there is a need for an imaging system and a method that can detect, and localize the objects in a scene from an image of the scene without a need to query the training database.

SUMMARY OF THE INVENTION

Some embodiments of the present disclosure provide an imaging system and a method for localizing an object in a scene from an image of the scene. It is an object of some embodiments to provide such an imaging system that can localize the objects in a scene without a need to query the training database. It is another object of some embodiments to provide such an imaging system that can build a model of the object using a single RGB-D image (a single shot) of the scene.

Some embodiments are based on recognition that a scene can include multiple objects of the same type. For example, supermarket shelf may store a number of objects/instances of the same product. Some embodiments are based on a realization that the knowledge about the presence of multiple objects of the same type in a scene can be used to detect and localize an object in the scene. Also, localization of multiple objects having different poses in the scene representing various viewpoints of different instances of the same object can be used to build a model of the object.

Some embodiments are based on recognition that when an image include multiple instances of the same object, there is a single transformation that can transform different points of one instance of the object into the corresponding points of the other instance of the object. To that end, that single transformation between corresponding points can serve as a notion for clustering different pixels of the image without the need to know the type of the object the pixels are clustered for.

For example, if there are three object in a scene, there is a first transformation that transforms at least some pixels representing the first object into pixels representing the second object, there is the second transformation that transforms at least some pixels representing the first object into pixels representing the third object, and there is the third transformation that transforms at least some pixels representing the second object into pixels representing the third object. When the first, the second, and/or the third transformations are identified, those transformations can be used to cluster the relevant pixels of different instances of the object. A cluster can be used to build a model of the object. Additionally, or alternatively, pixels of multiple clusters can be fused to improve the accuracy of the model.

Some embodiments identify the common transformations to be used for clustering at least some pixels of the image using appearance similarity and geometric similarity of the pixels. The appearance similarity comes from the understanding that the pair of features that comes from the same location of the two instances of the object should be similar. The geometric similarity comes from the understanding that two groups of features corresponding to each other based on appearance similarity should have the same in-group geometric distribution. In other words, there exists a single transformation that would transfer and align the positions of features in one group to the positions of features in the other group.

To that end, some embodiments cluster at least some pixels of the image of a scene, wherein the scene includes multiple objects of the same type, into a set of clusters including a first cluster and a second cluster so that there exists a single transformation that transforms different groups formed by different combinations of pixels from the first cluster into the matching groups formed by pixels from the second cluster.

The matching is performed using an appearance similarity and a geometric similarity. For example, a first group formed by pixels of the first cluster is matched to a second group formed by pixels of the second cluster, when a feature of any pixel forming the first group matches a feature of a pixel forming the second group and a distance between any pair of pixels in the first group matches a distance between a pair of corresponding appearance matching pixels in the second group. In such a manner, the risk of incorrectly matching pixels from different parts of the object is reduced.

For example, if the first group formed by three pixels of the first cluster matches the second group formed by three pixels of the second cluster, the feature of the first pixel of the first group matches the feature of the first pixel of the second group, the feature of the second pixel of the first group matches the feature of the second pixel of the second group, and the feature of the third pixel of the first group matches the feature of the third pixel of the second group.

Also, the distance between the first and the second pixels of the first group matches the distance between the first and the second pixels of the second group, the distance between the first and the third pixels of the first group matches the distance between the first and the third pixels of the second group, and the distance between the second and the third pixels of the first group matches the distance between the second and the third pixels of the second group. In such a manner, the first and the second groups can be aligned with each other.

As used herein, the appearance features, e.g., color intensity, and/or geometrical features, e.g., distance, are matching to each other when a difference between the matching features is less than a threshold. The threshold can be an application specific, e.g., provided by a user of the imaging system. For example, some embodiments use a first threshold to determine an appearance similarity and a second threshold to determine a geometric similarity. The first and the second thresholds can be identical or different.

In various embodiments, the appearance similarities are determined from the features of the pixels. For example, the features can be determined from the color information of the pixels. In contrast, the geometric similarities are determined from the locations of the points of the object in the scene that are scale and appearance invariant. However, both the color and location information can be received from a single color and depth image, e.g., RGBD image. To that end, some embodiments determine the pose of the object using a single RGBD image.

For example, in some embodiments, the features of the pixels are a function of values of the color intensities of the pixels. In different embodiments, the features of the pixels are extracted from the intensities of neighboring pixels. For example, some embodiments employ a sparse feature representation, where the features are extracted only from a subset of pixels of the images. For example, the pixels in the subset of pixels may be keypoint pixels. As used herein, a keypoint pixel has the maximum or the minimum value among all values of pixels from a patch of the image centered on the keypoint pixel. The value of the keypoint is a function of each color intensity of the pixel. The keypoints allows reducing the search space for clustering the pixels. In addition, the keypoints can increase the reliability of the matching. For example, the feature of the keypoint can be a function of intensities of pixels from the patch centered on the keypoint pixel to ensure more accurate appearance similarity matching.

Different embodiments select pixels and a group for pixels for matching in a different manner. For example, one embodiment groups at least some pixels in the image to form a set of groups. In some embodiments, each group includes at least three pixels, which is a minimum number of pixels forming a shape suitable for computing a 3D rigid transformation. In various implementations, the pixels can belong to one or multiple groups.

Some embodiments compare the groups or features of the pixels of the groups using the appearance and geometry similarity. In some implementations, the embodiments first determine the groups having the appearance similarity to form the pair of matching groups from the appearance point of view. After that, the pairs of matching groups are tested for the geometric similarity to determine the transformations that can be used as a notion of clustering. In such a manner, the computational expenses of the clustering can be reduced.

For example, one embodiment forms the pairs of matching groups by extracting the features from pixels of the subset of pixels of the image and comparing the features of each pair of the pixels in the subset to determine pairs of matching pixels. These pairs of the matching pixels are used to form the pairs of matching groups using different combinations of at least three pairs of matching pixels. For example, three pairs of the matching pixels can form one pair of matching group, i.e., a pair of a matching triplet, where for each pixel in one group there is an appearance matching pixel in another group.

For example, if the pair of matching group includes a first group of pixels matching in appearance with the pixels of a second group, the method according to embodiments of the present disclosure determines transformations that transfer and align the features of pixels of the first group with the features of pixels of the second group for at least some pairs of matching groups. In some implementations, only a portion of the pairs of matching group can be aligned using both the appearance and geometrical similarity. It is possible, and even likely, that some groups can be matched using the appearance similarity test, but fail the geometry similarity test.

After the groups of pixels satisfying the appearance and the geometry similarity are determined, the geometrical transformations associated with groups can be used as the notion of clustering. For example, one embodiment determines a matching transformation common for multiple groups. As used herein, two transformations are matching if a difference between a first transformation transforming a first group of pixels into a second group of pixels in a first pair of matching groups and a second transformation transforming a first group of pixels into a second group of pixels in a second pair of matching groups is less than a threshold. The threshold can be an application specific, e.g., provided by a user of the imaging system.

The matching transformations are used as a notion of clustering. For example, one embodiment selects the pixels of the first groups of the pairs of matching groups associated with the matching transformation into the first cluster and selecting the pixels of the second groups of the pairs of matching groups associated with the matching transformation into the second cluster.

Some embodiments use pixels of one or several clusters to determine a model of the object, which can facilitate pose estimation. For example, one embodiment determines a model of the object using the pixels of the first cluster and determines the pose of the object using the model of the object. Additionally, or alternatively, the embodiment can fuse pixels of the several clusters to produce the model of the object. For example, in one implementation, the embodiment fuses the pixels using a random sample consensus (RANSAC) framework.

An embodiment of the present invention provides a method for object discovery and modeling from a single RGB-D image containing multiple instances of the same object.

According to another embodiment of the present invention, it provides an efficient grouping algorithm that generates a set of relative pose candidates using triplets of keypoint matches and then clusters them to find each instance of the object and their relative poses.

Further, some embodiments of the present disclosure provide experimental results as examples using several objects used in the Amazon Picking Challenge and demonstration of an application for picking objects based on a method according to the present invention.

According to embodiments of the present disclosure, since it is possible that querying the training database with the input images can be reduced, the consumptions of memories, the central processing unit (CPU) usage, power consumption, and/or network bandwidth usage can be reduced.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 9 is an example result indicating the model creation and detection performance on the generated dataset, according to embodiments of the present invention;

Figure 1:
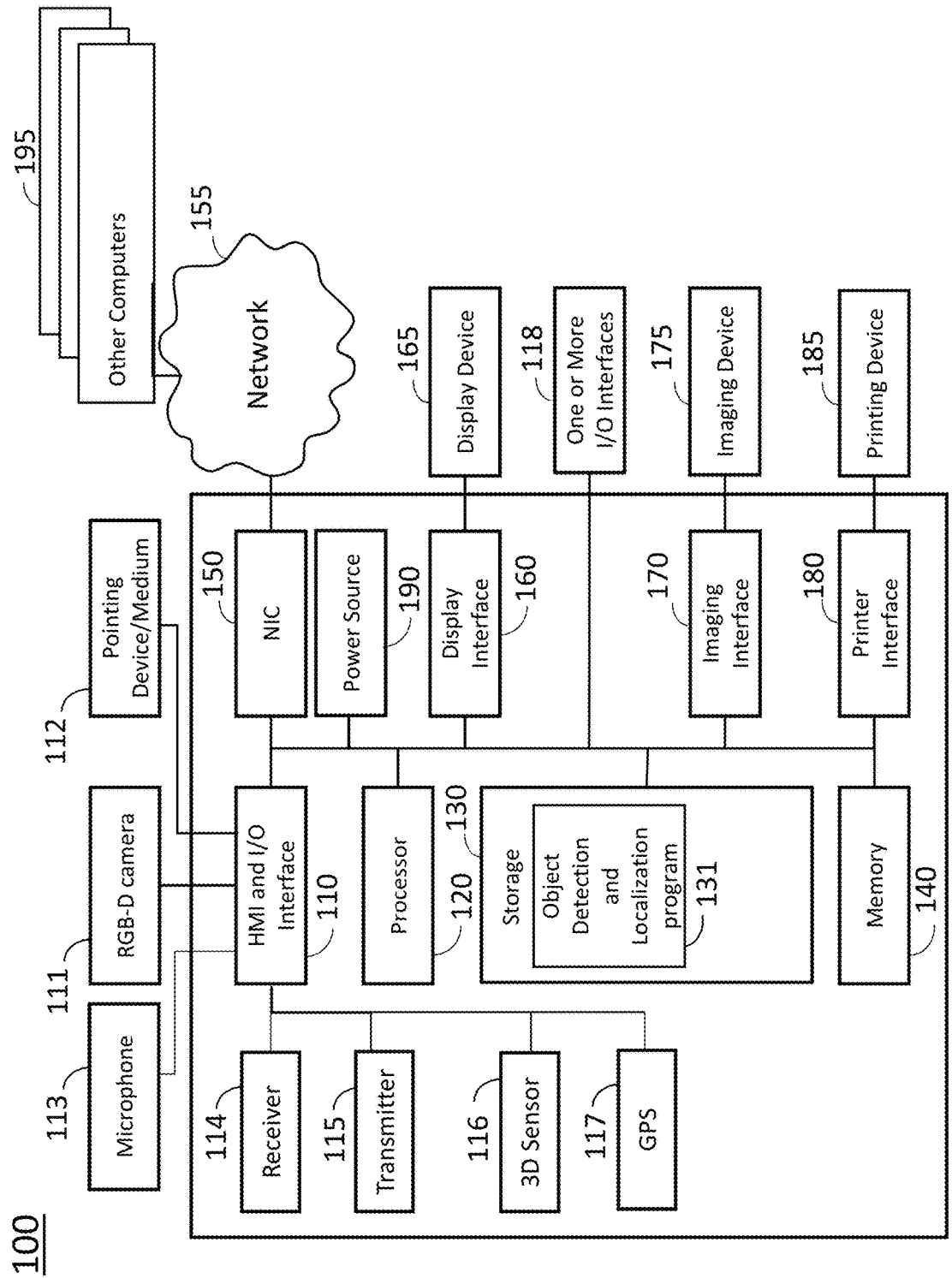
FIG. 1 is a block diagram illustrating an imaging system for object detection and localization, according to embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is a block diagram illustrating an image processing system 100 for object detection and localization according to embodiments of the present disclosure.

The image processing system 100 can include a human machine interface (HMI) with input/output (I/O) interface 110 connectable with at least one RGB-D camera 111 and a pointing device/medium 112, a microphone 113, a receiver 114, a transmitter 115, a 3D sensor 116, a global positioning system (GPS) 117, one or more I/O interfaces 118, a processor 120, a storage device 130, a memory 140, a network interface controller 150 (NIC) connectable with a network 155 including local area networks and internet network (not shown), a display interface 160 connected to a display device 165, an imaging interface 170 connectable with an imaging device 175, a printer interface 180 connectable with a printing device 185. In some cases, the camera 111 may be an RGB camera with no depth sensor.

The HMI with I/O interface 110 may include analog/digital and digital/analog converters. The HMI with I/O interface 110 includes a wireless communication interface that can communicate with other object detection and localization systems or other computers via wireless internet connections or wireless local area networks, which enable to perform remote multiple object detection and localization. The image processing system 100 can include a power source 190. The power source 190 may be a battery rechargeable from an external power source (not shown) via the I/O interface 118. Depending upon the application the power source 190 may be optionally located outside of the system 100.

The HMI and I/O interface 110 and the I/O interfaces 118 can be adapted to connect to another display device (not shown) including a computer monitor, camera, television, projector, or mobile device, among others.

The image processing system 100 can receive electric text/imaging documents including speech data via the network 155 connected to the NIC 150. The storage device 130 includes an object detection and localization program 131, in which algorithms of the object detection and localization program 131 are stored into the storage 130 as coding data. The algorithms 131 may be stored to a computer readable recording medium (not shown) so that the processor 120 can execute the object detection and localization program 131 according to the algorithms by loading the program 131 from the medium. Further, the pointing device/medium 112 may include modules that read programs stored on a computer readable recording medium.

For instance, the program 131 may include a program module of an object identifier that clusters a first cluster of first pixels and a second cluster of second pixels among pixels of the image so that a single transformation transfers the first pixels to the second pixels, respectively. Further, the program may include a program module of an object locator to determine a first pose of an object represented by the first pixels of the first cluster. In this case, a first group formed by the first pixels of the first cluster matches to a second group formed by the second pixels of the second cluster when a first appearance of any pixel of the first group matches to a second appearance of a pixel of the second group and a first distance between any pair of pixels in the first group matches a second distance between a pair of corresponding appearance matching pixels in the second group.

Further, the program 131 may include a program module of a feature extractor to extract features of the objects in the image based on the intensity values of the pixels, a program module of a feature pair finder to find feature match pairs of the objects from the extracted features based on an appearance similarity of the extracted features, wherein the appearance similarity is defined by the intensity values of the pixels, a program module of a triplet generator to generate triplets from the feature match pairs, a program module of a matching finder to find matched triplets from the generated triplets based on a geometric similarity, and a program module of a clustering module to cluster sets of the triplet pairs having similar transformations defined by predetermined parameters.

In order to start acquiring an image data using the sensor 116, instructions may be transmitted to the system 100 using a keyboard (not shown) or a start command displayed on a graphical user interface (GUI) (not shown), the pointing device/medium 112 or via the wireless network or the network 190 connected to other computers 195. The acquiring of the image may be started in response to receiving an acoustic signal of a user by the microphone 113 using pre-installed conventional speech recognition program stored in the storage 130.

The processor 120 may be a plurality of processors including one or more graphics processing units (GPUs). The storage 130 may include speech recognition algorithms (not shown) that can recognize speech signals obtained via the microphone 113.

Further, the image processing system 100 may be simplified according to the requirements of system designs. For instance, the image processing system 100 may be designed by including the at least one RGB-D camera 111, the interface 110, the processor 120 in associating with the memory 140 and the storage 130 storing the object detection and localization program 131, and other combinations of the parts indicated in FIG. 1.

The image processing system 100 may be included or connected to a control system of a robotic arm (not shown) for manipulating objects based on the object detection and localization program 131 with at least one RGB-D camera 111 mounted near a handling portion of the robotic arm. As an example, a robotic arm system 60 including the image processing system 100 and an RGB-D camera is shown in FIG. 10.

Object model generation is crucial for robotic manipulation. Typical object detection and localization methods have a separate supervised stage where they learn and build object models. However, the types of objects a robot needs to interact with can expand and change rapidly, such as new items arriving at a warehouse as seen in the scope of Amazon Picking Challenge. On the other hand, in many situations, objects appear in multiple copies. The present disclosure describes this fact and presents a method for discovering and modeling an object from a single RGB-D frame in which the object appears in multiple copies. The recurrent patterns found in the single frame can be used to automatically discover the object, and the various viewpoints of different instances can provide valuable information for object model generation.

According to embodiments of the present invention, an assumption used in the method is based on the existence of at least two instances of an object in the single RGB-D image. The method need not to use any prior knowledge about the number, shape, and appearance of the object. Thus, the object can appear in a cluttered scene or the image can contain multiple instances of different objects. Our method performs on-the-fly object model generation, while detecting and localizing the instances of the reconstructed object in the given image. Thus, the method according to embodiments of the present invention enables online robot manipulation using only a single-shot image. The method is advantageous for reducing the consumptions of memories, the central processing unit (CPU) usage, power consumption, and/or network bandwidth usage.

The technique used in the present method may employ a sparse feature representation. Therefore, an object detection and localization problem can be seen as finding groups of features that correspond to different instances of the object. To solve this grouping problem the following information can be used:

Appearance similarity: Pairs of features that come from the same location (proximity location or neighboring location within a predetermined distance) of two instances should be similar.

Geometric similarity: Two groups of features corresponding to each other based on appearance similarity should have the same in-group geometric distribution. In other words, there exists a single transformation that would transfer and align the positions of features in one group to the positions of features in the other group.

The system 100 employs the appearance and geometric constraints jointly. Furthermore, the system 100 may avoid the use of depth segmentation and spatial closeness to decide whether features are coining from the same instance, as the objects might be touching with each other or occluding one another. The image processing system 100 looks for recurrent patterns in the image using both geometric and appearance similarity following the sparse feature representation. First, the system 100 extracts keypoints and match them based on the descriptor similarity. The system 100 then find triplets of keypoints matching with each other using several geometric criteria. In this case, the geometric criteria may be defined for pairs and triplets of the matched keypoints and are invariant to the 6-degree-of-freedom (6-DOF) transformations. Each of the matched triplets provides a 6-DOF transformation, which is a candidate of the relative pose between two instances of the object but might be an outlier. Thus, in the second stage the system 100 clusters the relative poses associated with each triplet match and find clusters supported by many triplets corresponding to the inliers. The matches that appear in the same cluster are likely to belong the same pair of objects. Thus, in the third stage we generate an initial model based on the clustering results. Lastly, the generated model is used in an RANSAC framework in order to detect the instances among the remaining keypoints, which can yield further expansion and enrichment of the generated model.

Figure 2:
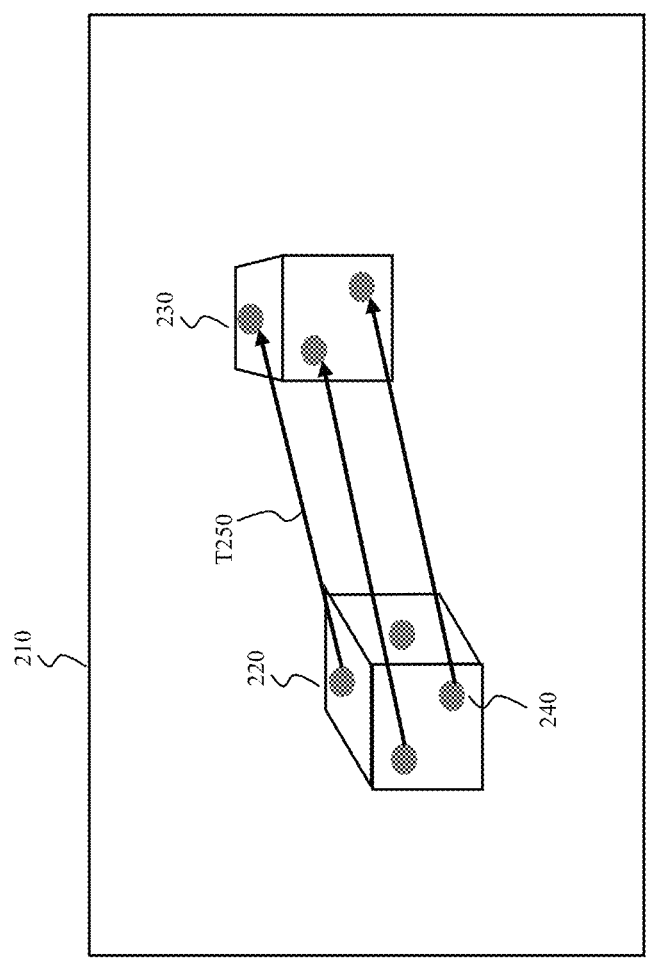
FIG. 2. is an illustration of an object detection method used in the imaging system, according to embodiments of the present invention.

FIG. 2 is an illustration of an object detection method according to embodiments of the present invention. In this case, a red green blue depth (RGBD) image 210 of a single shot (or a single frame) is provided from an RGBD camera. An object identifier finds a set of features 240 that refer to different copies 220, 230 of the same object, where there is an appearance similarity 250 between pairs of features in different instances 220, 230. The object identifier can be a program module including instructions performed in the object detection method.

Moreover, there is a single transformation that will transfer the points in one instance 220 and align with the matching features in the second instance 230. In other words, the method involves a search in which the object identifier identifies subgroups of features 240 that look similar to each other in terms of appearance and there exists a single geometric transformation to align matching features in two subgroups. In some cases, the appearance may be defined by an intensity value of a contrast of an instance of the object in the image. As can be seen although some parts of the object might not be visible in an instance (i.e. side of object instance 230), the method is able to locate the objects using the features that are seen in both of them.

Figure 3:
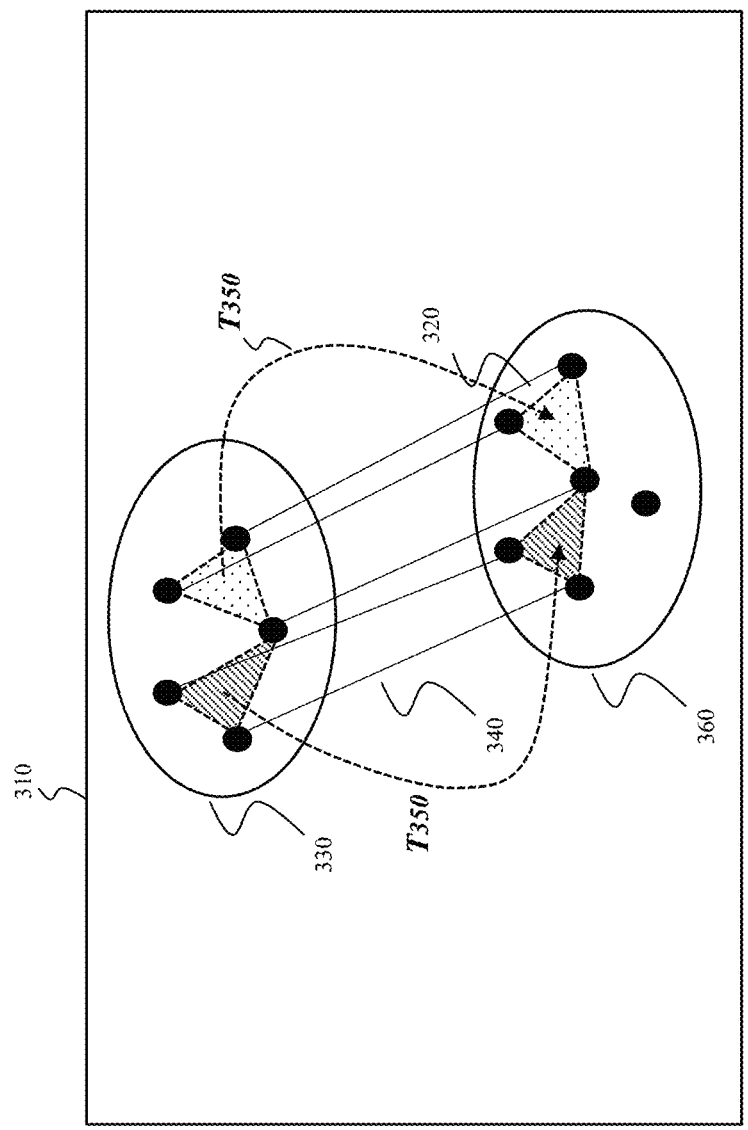
FIG. 3 is a depiction of a clustering method used in the imaging system, according to embodiments of the present invention.

FIG. 3 shows a depiction of a clustering method according to embodiments of the present invention. The clustering method generates matching triplets 320 out of matching keypoints 340 in the RGBD image 310. Each matching triplet 320 defines a rigid transformation T350 that will align matching points. Since there should be a single transformation that will align all features of an instance 330 to the matching features of the other instance 360, the clustering method performs clustering of matching triplets using their associated transformations T350. The results of the clustering provide all matching features between pair of instances.

Method

An embodiment of the present invention provides to discover, model, and localize an object in a scene without any prior knowledge. The input is a single RGB-D frame (a single shot), including a color (or grayscale) image and a depth map of the scene. The image processing system 100 uses sparse 3D feature points throughout our pipeline, and thus ignores pixels that have invalid depth measurements.

According to embodiments of the present invention, an image processing method consists of four main steps. In the first step, the image processing method extracts keypoints and generate triplet matches based on the descriptor similarity and several geometric criteria that are invariant to the 6-DOF transformations. Second, the method clusters triplet matches based on their relative poses based on an assumption of a geometric similarity among groups of features. Third, the method generates an initial model using the clustering results. At the fourth step, the initial model is used to detect additional object instances in the remaining set of features that have been considered outliers in the clustering step, which can further enhance the object model. Each of the four steps is detailed in the following subsections.

Matching Triplets of Keypoints

In the first step, the goal of the image processing method is to generate triplets of keypoint matches, each of which provides a candidate of the relative pose between two instances of the object in an image. For instance, the Scale-invariant feature transform (SIFT) may be used to detect and describe N keypoints from the pixels that have valid depth measurements. Accordingly, each keypoint may specify 2D location, scale, and orientation of an instance of the object in the image. Every keypoint in this set is compared to all others to find its most similar keypoint. The similarity measure may be defined by the Euclidean distance between the 128 dimensional feature descriptors. The method may also threshold the Euclidean distance to maintain M<N keypoint matches for the following processes.

Based on appearance similarity, the method assumes that two instances of an object have similar keypoints. However, the single keypoint matches are not robust enough, include many outliers, and do not provide the relative pose between the two instances. Thus triplets of keypoint matches are used to be robust to outliers and to obtain the relative pose using three 3D point registration.

Out of a total of M(M−1)(M−2) possible triplets, the method tries to select correct triplets based on the following geometric criteria invariant to the 6-DOF transformations, as discussed below.

Point Pair Feature Similarity

Figure 4:
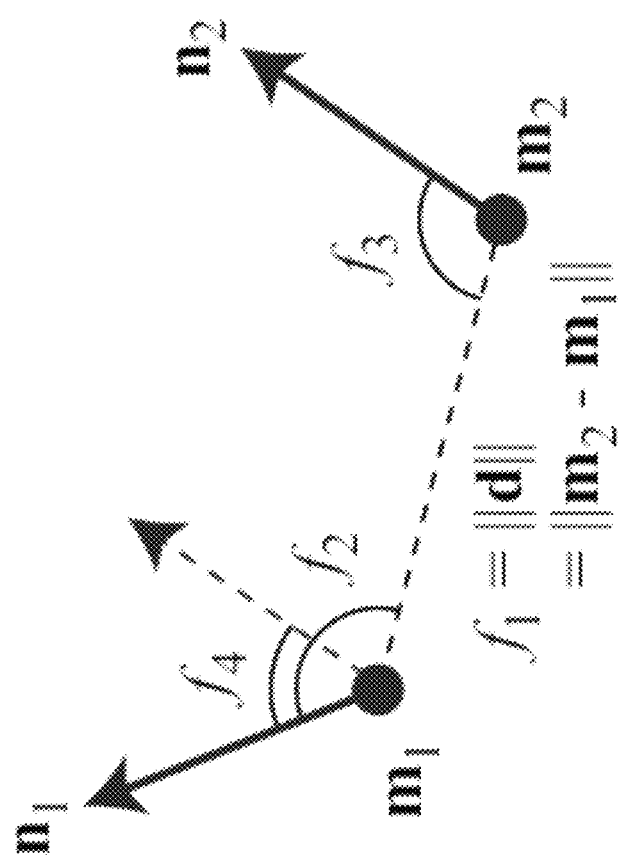
FIG. 4 is a diagram illustrating two surface points for determining a point pair feature, according to embodiments of the present invention.

FIG. 4 shows a diagram illustrating two surface points m1 m2 for determining a point pair feature.

Point pair features describe the relative position and orientation of points on the surface of an object. For instance, for two points in $m_1$ and $m_2$ with normals $n_1$ and $n_2$, with $d = m_2 - m_1$ the feature F is $$F(m_1, m_2) = (\|d\|_2, \angle(n_1, d), \angle(n_2, d), \angle(n_1, n_2)), \quad (1)$$

where denotes $\angle(a,b) \in [0\ \pi]$ the angle between two vectors. Let $l_1$ and $l_2$ be keypoints matching with $m_1$ and $m_2$ respectively. We compute the difference of point pair features between the matches as $F(m_1, m_2) - F(l_1, l_2)$ and apply a threshold on the calculated difference to filter out incorrect correspondences. We compute the difference of point pair features between keypoint matches and apply a threshold on the calculated difference to filter out incorrect correspondences. In other words, we expect to have same surface normal on the matching points of the triplets along with close edge size.

Triangle similarity: Each triplet of keypoint matches consists of two corresponding triangles. The angles of the two triangles should be similar for the triplet to be correct.

Sidedness: we check whether the third point of the triplet falls on the same side of the line defined by the other two points to avoid reflections.

Since the point pair feature similarity can be computed for pairs of keypoint matches, we first use this criterion for efficient pruning of incorrect pairs and then use the other criteria for selecting correct triplets.

Also, to ensure the found corresponding triangles will yield sufficiently accurate transform estimations, triangles that will be strongly affected by sensor noise are removed. This is done using a minimum triangle edge length and maximum angle acuteness threshold.

Clustering Procedure

For each of the triplets obtained in the first step, a 6-DOF pose that transforms the triangle to its corresponding triangle is estimated. Let $P=(p_1, p_2, p_3)$ and $Q=(q_1, q_2, q_3)$ denote two matching triangles where $p_1, q_1 \in R^3$ are 3D positions of the keypoints. The calculation of the pose results in the transformation $T_{p,q} \in SE(3)$ that consists of a rotation matrix $R \in SO(3)$ and a translation vector $t \in R^3$ such that $q_i = T_{p,q}(p_i) = Rp_i + t$. These transformations are clustered using a spectral clustering algorithm, such as DBScan algorithm, to discover sets of triplets with similar transformations. In some cases, a spectral clustering algorithm can be referred to as an object identifier and stored as a program into a memory. The object identifier can be executed by a processor in association with the memory. DBScan is a density based clustering method, which only requires a single input parameter for the maximum distance between two instances that are allowed to be clustered together. During clustering, we exploit sum of 3D point-to-point distances as the distance between two triplets in clustering. For symmetry, the distance is computed both ways. Thus, the distance between two matching triplets (P,Q) and (A,B) based on the respective transformations $T_{p,q}$ and $T_{a,b}$ is $$D((P, Q), (A, B)) = \sum_i^3 \|T_{p,q}(a_i) - b_i\| + \sum_i^3 \|T_{a,b}(p_i) - q_i\|. \quad (2)$$

The output of clustering can contain the same pair of instances in two different clusters with associated poses as inverse of each other. Hence, if such clusters are found, one of them is inverted and the clusters are merged. The transformation for each cluster is then recalculated considering all sets of corresponding triplets in the cluster.

Initial Model Creation

The clustering procedure results in sets of points that belong to the same object instance and are matched to another object instance. In other words, each cluster can be seen as two sets of points, where one set can be aligned with the other set using the transformation of the cluster. Some of these sets may have keypoints in common with other sets. Thus, the clustering result can be represented as a graph where nodes correspond to sets of points and edges correspond to the distance between sets based on the transformation of the cluster associating the two sets. If two sets have points in common, then the transformation between them is identity and the connecting edge is set to have a small preset weight. An example is shown in FIG. 5.

Figure 5:
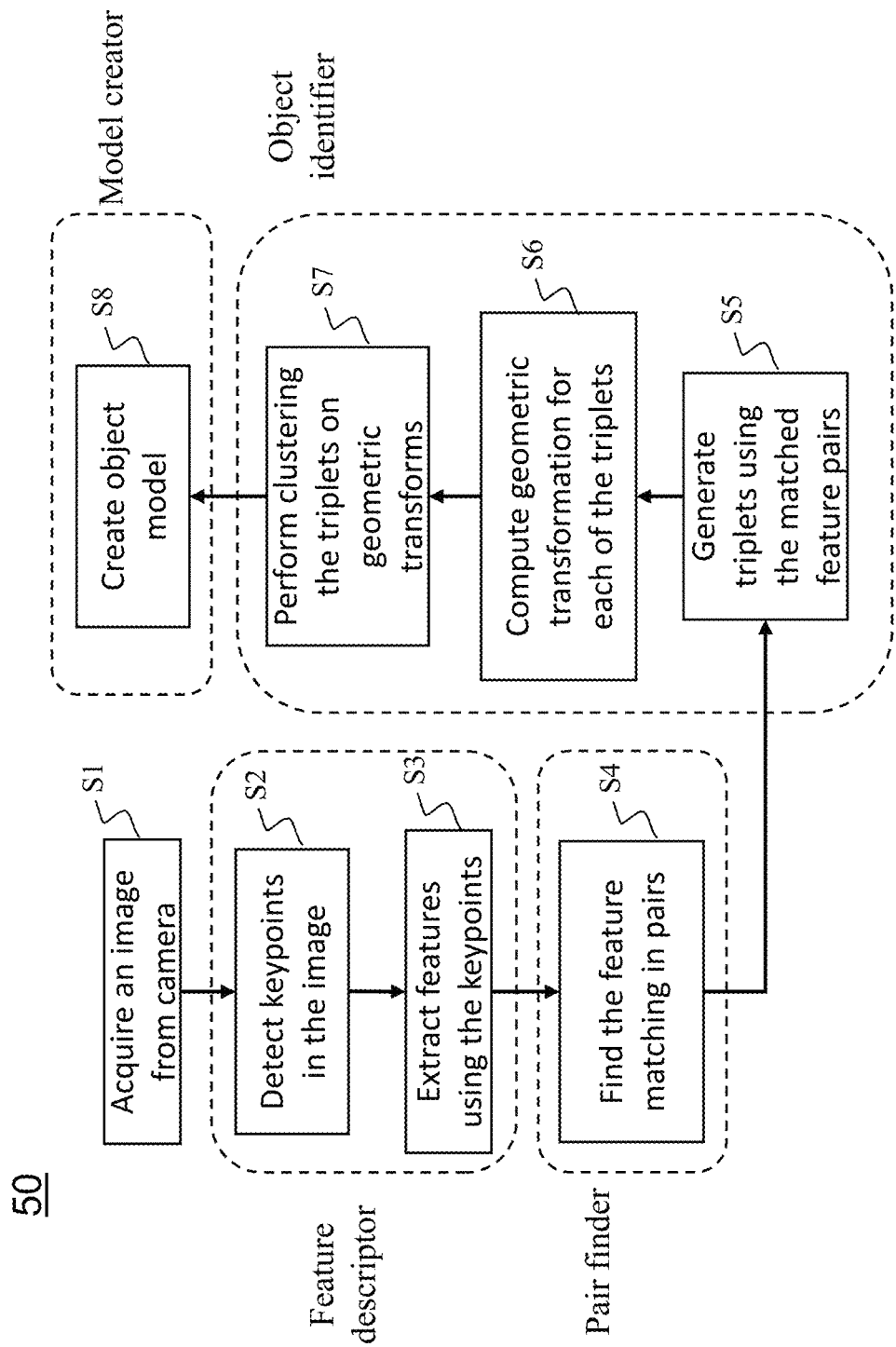
FIG. 5 is a diagram illustrating functional steps of an object detection and localization method used in the imaging system, according to embodiments of the present invention.

FIG. 5 is a function diagram illustrating an object detection and localization process 50, according to embodiments of the present invention. The object detection and localization process 50 may be performed by implementing an object detection and localization program stored into a storage device such as a memory using a processor.

An image is acquired from an RGBD camera in step S1. The image indicating a scene may be obtained via a network connecting computers or another camera connected to the network. The network may be a wired communication network or a wireless communication network. The object detection and localization process 50 detects and extracts keypoints from the image using a feature descriptor in steps S2 and S3 based on an appearance similarity. For instance, the appearance similarity may be defined by an intensity value or color intensity of an instance of the object. The feature descriptor is included in the object detection and localization program. In step S4, the process 50 finds the features that are matched in pairs among the extracted features of the keypoints. Step S4 may be performed using a feature match finder included in the object detection and localization program. Further, the process 50 generates triplets using the matched feature pairs in step S5. In this case, the generated triplets include pairs of matched triplets as the triplets consist of the matched feature pairs. The process 50 computes a geometric transformation for each of the generated triplets in step S6. In step S7, the process 50 defines a transformation for each of the matched triplets and clusters the matched triplets using their associated transformations. In this case, each of transformations associated with the matched triplets represents a pose of an instance of the object, wherein the pose includes a location and an orientation of the object. By fusing the information regarding poses of instances for each of the matched triplets, an object model creator in the object detection and localization program determines the poses and creates an object model in step S8. Further, the object model creator may be referred to as an object locator.

Figure 6:
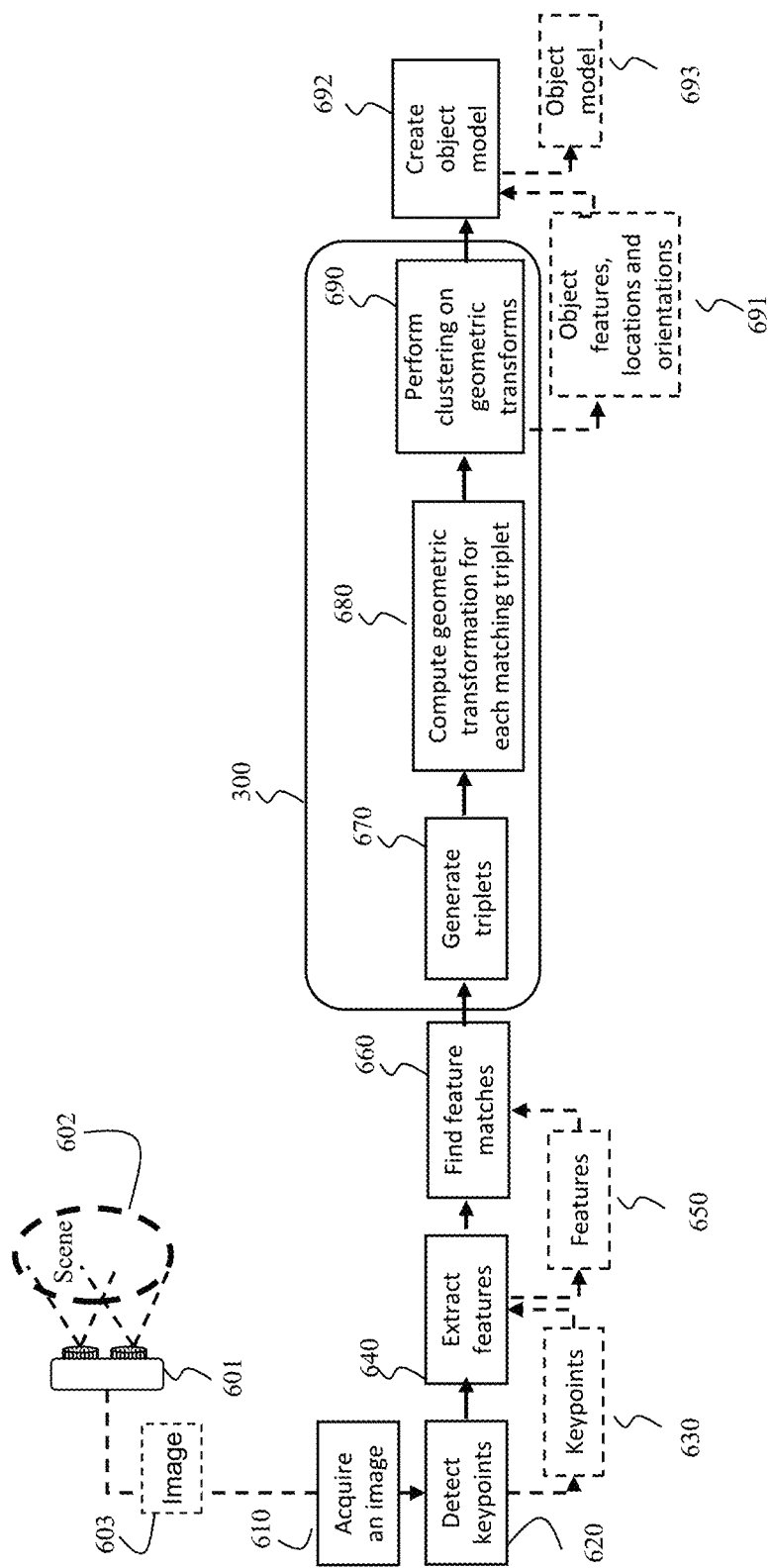
FIG. 6 is a block diagram illustrating process steps for an object detection and localization used in the imaging system, according to embodiments of the present invention.

FIG. 6 is a diagram illustrating processes performed in an object detection and localization system according to embodiments of the present invention. In the figure generally, solid lines indicate processes and process flow, and dashed lines indicate data and data flow. And RGB-D camera 601 captures an image 603 of a scene 602. After image acquisitions in step 610, keypoints 630 are detected in step 620 on the image 603 and features 650 are extracted in step 640 on the detected keypoints 630. After finding feature matches 660 according to appearance similarity, triplets are generated 670 based on matching features. Each matching triplet is represented with a geometric transformation 680 followed by a clustering based on the computed transforms 690. The output of clustering yields object poses, that comprises of location and orientation 691. An object model 693 is created 692 by fusing this object instance information.

Figure 7:
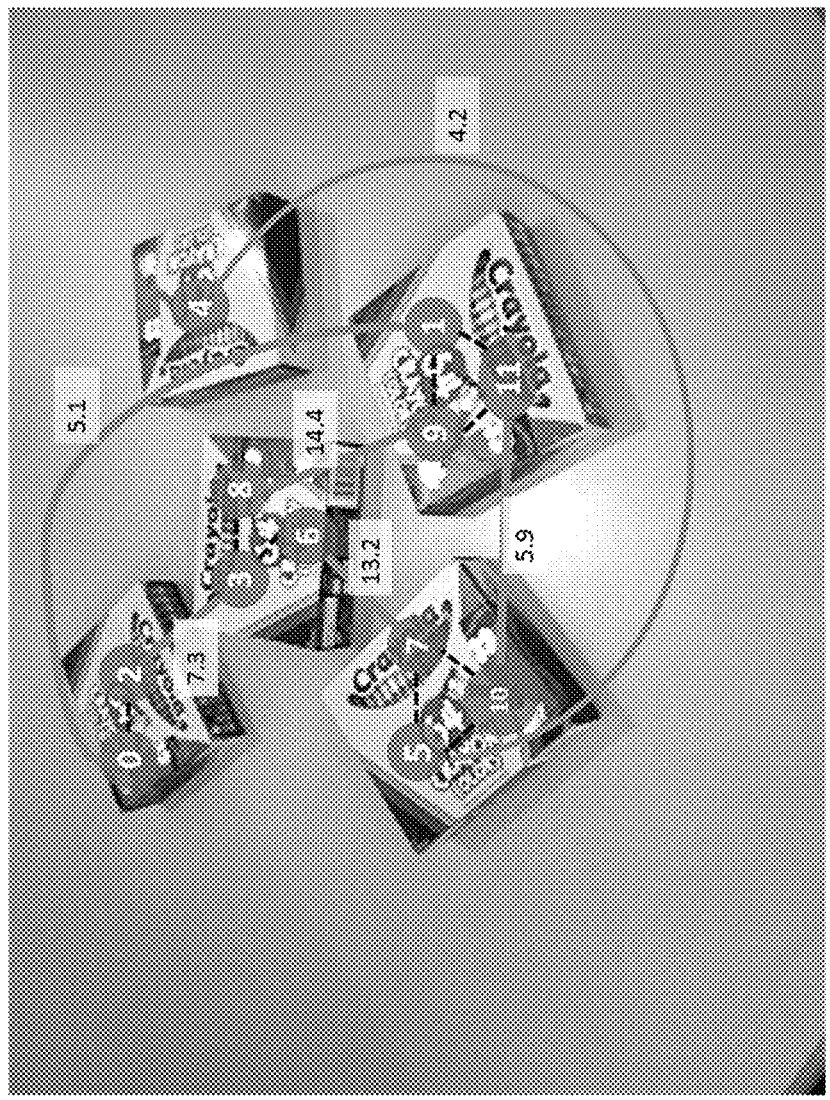
FIG. 7 is a drawing indicating a graph representing clustered sets of points (vertices) and their relations (edges), according to embodiments of the present invention.

FIG. 7 is a drawing indicating the graph representing clustered sets of points (vertices) and their relations (edges). Note there are two types of relations between sets of points: sets that were clustered together because they contain similar triplets (thick solid lines), and sets that are connected because they have points in common (dashed lines). The edges representing matched triangles have a label showing the distance (the transformation error of the transform between them).

The resulting graph can have multiple connected components, since the scene can contain multiple instances of various types of objects. In order to create a model for each connected component, we first decide which node will be the reference frame all sets will be projected to. We pick the node representing the set of points with the highest number of matches and common points as the reference. All other sets of points that are connected to it are transformed to the reference frame by applying a series of transformations. The optimal series of transformations for every set is found by searching for the shortest path to the reference frame using Dijkstra's algorithm.

The 3D object model consists of all points transformed to this common reference frame, and associated with their original keypoint descriptors. This process generates an object model for each connected component in the graph, hence it might yield multiple models, each containing points from all sets connected to their initial reference set.

Additional Instance Detection

After creating a set of object models, every model is compared to all others to verify whether they truly are distinct objects, or whether their correspondence was simply missed by the earlier steps (this is possible because we enforce a unique match between keypoints in our first step, instead of considering all possible matches). For each model, we perform detection between the model and the sets of points from the other connected components of the graph. This is performed by a correspondence search via descriptor similarity and a geometric verification by a 3-point RANSAC registration.

We perform keypoint matching between the model points and the local neighborhood of the set of points using the model diameter as an estimate of the size of the object. We proceed with an RANSAC registration: three scene points are randomly selected, their matched points on the object are used to estimate an initial transformation, and the number of inliers is counted (the percentage of matched points that, when transformed, are within a certain distance of their corresponding points). The transformation is then re-estimated based on the inliers of the most successful attempt. RANSAC succeeds if the inliers ratio is larger than a certain threshold. In the case of a successful RANSAC, the models are merged. Otherwise, they are kept as separate models.

In a final stage, an attempt is made to detect any remaining instances that had not been matched before. We use the remaining keypoints that are not associated with any of the nodes in the graph. This avoids matching the model to the previously detected instances.

Experimental Results

Setup

Figure 8:
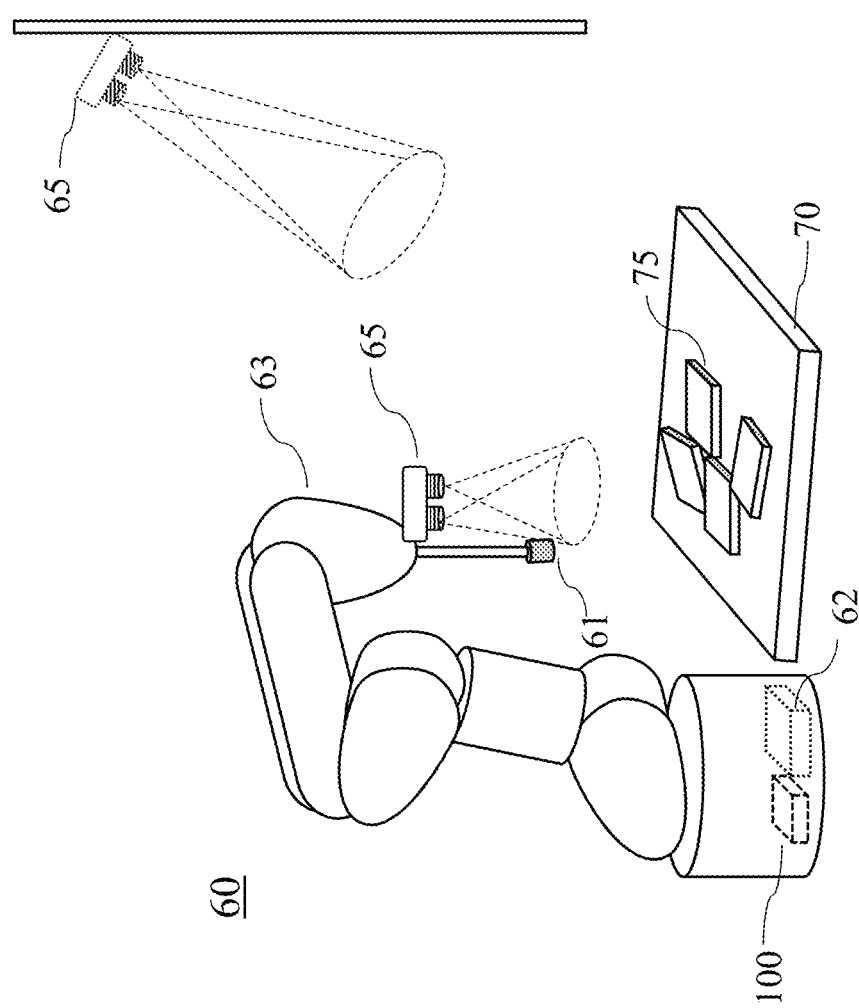
FIG. 8 is a drawing illustrating a robot arm for picking objects using the image processing system, according to embodiments of the present invention.

FIG. 8 is a drawing illustrating an example setup of a robot arm 60 including a vacuum gripper 61 and an ASUS Xtion Pro Live RGB-D camera 65 arranged at the end of the robot arm 60. The camera 65 provides VGA (640 ×480) resolution color and depth images. The depth image is converted to a 3D pointcloud and transformed to the RGB cameras reference frame. Accordingly, every point measured by the camera 65 has both a 3D coordinate and a color value. Further, the robot arm 60 includes a localization controller (not shown) that localizes the top of the vacuum gripper 61 to a desired position. The localization controller also includes the image processing system 100. The desired position is determined based on the image data processing of an image obtained by the camera 65 for picking up objects. The image data processing is performed for object detection and localization using the image processing system 100 obtaining image data of objects 75 on a table 70 in association with the camera 65. The robot arm 60 includes a motion control circuit 62 for controlling the movement of the robot arm 60. The motion control circuit 62 operates the robot arm 60 and is connected to the image processing system 100 via a cable connection or a wireless communication. Further the image processing system 100 may be arranged outside the robot arm 60. In some cases, the object detection and localization program 131 may be stored into a memory of the motion control circuit 62 so that the robot arm 60 can control the physical motion of the arm 60 in association with the camera 65. In order to pick an object 75, the image processing system 100 detects the object 75 and analyze the normal direction of the surface and a central position of the object 75, and inform the detection and analysis data to the motion control circuit 62. The motion control circuit 62 operates the gripper of the robot arm 60 to approach a center of the object 75 so that the gripper 61 sucks the object 75 for picking.

In some cases, the camera 65 may be arranged separately from the robot arm 60 at a predetermined position where the camera 65 can detect the objects 75 and the poses of the objects 75. Further, the camera 65 may be a wireless camera that can communicate with the image processing system 100 via a wireless connection.

We discuss below on qualitative and quantitative results considering various scenarios. For quantitative results, we create a dataset of 16 images, where two to five instances of an object are visible. We use four objects from Amazon Picking Challenge with various shapes and sizes and varying amounts of texture. We report the number of correctly detected objects and model generation success on this dataset. We also demonstrate the use of our algorithm in an object picking scenario with a robotic arm 60, where multiple instances of the same object are visible (Please see supplementary video). An ASUS Xtion sensor 65 is mounted on the end of the robot arm 60, and the robot arm 60 picks up objects using the vacuum gripper 61 of the robot arm 60 as shown in FIG. 8.

We use the following parameters in eliminating incorrectly matched triplets. We use 5 mm and 35 degrees for the first and last dimension of the point pair feature difference. Each edge of the triangle can be at least 10 mm and at most 125 mm and each angle should exceed 10 degrees. Maximum value of the distance between two samples in clustering is set as 35 mm, while we discard clusters with less than 16 samples. In detection, we use an RANSAC inlier threshold of 5 mm. An RANSAC is recalled as successful when there are at least 5 inliers and the inlier ratio is more than 12:5%. The average running time was 809 ms.

Quantitative Evaluations 1

Quantitative Results: FIG. 9 indicates an example of results obtained by model creation and detection performance on the generated dataset according to embodiments of the present invention. It should be noted that a number of instances are included in a single scene. For every scene we report the number of instances that are added to the initial model as a result of clustering and the number of additional detected instances using the initial model. We compare against the ground truth (GT) number of instances. 'Model' Y/N indicates whether the object was correctly modeled (Y) or Not (N).

Each object has four different scenes where the instances are placed randomly. The third column indicates the ground truth (GT) number of instances in the scene. The fourth column shows the number of instances that are added to the initial object model as a result of clustering. The fifth column reports the number of additional instances detected using the initial model. Finally, at the last column we report whether the algorithm resulted in a correct model of the object. As can be seen in almost all scenes, our method was able to create an initial model and enlarge it by proceeding with additional instance detection. The average accuracy in detecting the number of instances (i.e. the average of the percentages reported in total column) is 82:25%. The model generation success rate is 87:5%.

Figure 10B:
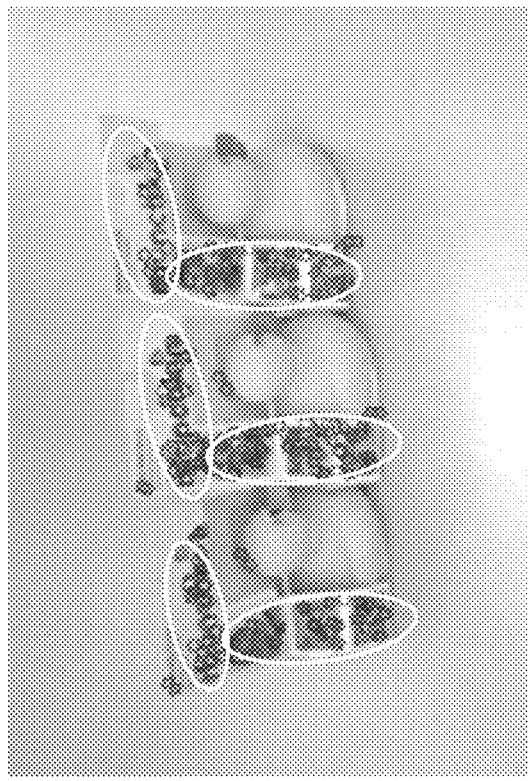
FIG. 10B is another example result indicating three matched ducks as placed side by side, according to embodiments of the present invention.
Figure 10A:
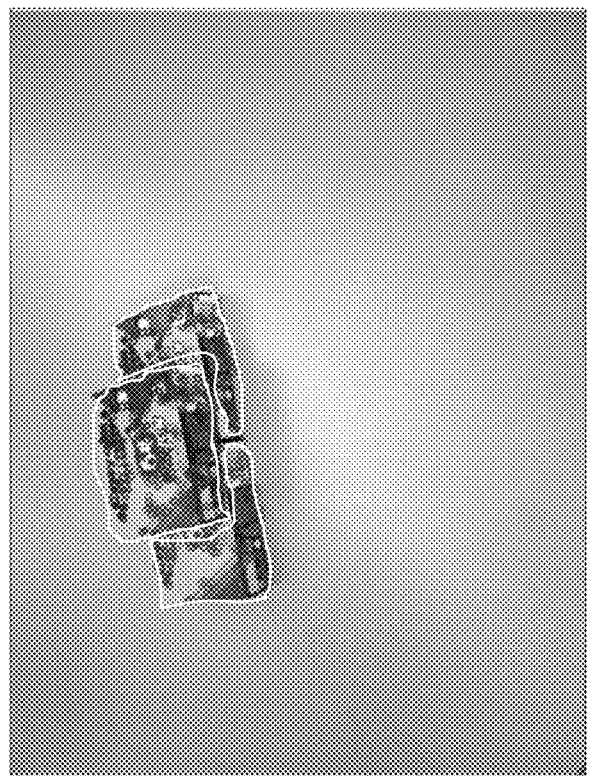
FIG. 10A is an example result indicating that two bottom Crayola boxes are matched with the box at the top, according to embodiments of the present invention.

Visual results on the dataset images can be seen in FIGS. 10A and 10B, which depict the instances that are added to the initial model as a result of clustering. The transformed object model is displayed with a random color for each instance. As can be seen not all instances are found at the clustering stage. Some example scenes are displayed in FIG. 11 where additional instance detection successfully detected the remaining instances.

Qualitative Evaluations 2

The proposed algorithm was tested on some additional scenarios to better analyze its capabilities. Our technique does not use any prior assumption about the number of objects and their placement in the scene. The evaluation result of our method on a scene with a large number of tea box instances indicates that all instances with valid depth measurements were discovered correctly. The average processing time for this set of scenes was 1069 ms (compared to 809 ms for the dataset with two to five object instances). Experiments on scenes with objects placed in an organized way give the results seen in FIG. 10A and FIG. 10B.

FIG. 10A shows an example where two bottom Crayola boxes were matched with the box at the top, that partially occludes the others. Since the two point sets have points in common, clustering was able to merge all point sets into a single object model. Both the boxes on the bottom left and bottom right are matched to the object on top. As examples, the groups of features detected in each instance is marked with white lines. Because the clusters have points in common, they are added to the same model. Our algorithm succeeds in building a complete model despite only one instances being completely visible.

FIG. 10B shows another example result indicating three matched ducks according to embodiments of the present invention. FIG. 10B indicates three ducks placed side by side. Our algorithm ends up with a model of two repetitive patterns, in which each model represents two neighboring ducks. This was expected as the clustering stage focus on the largest cluster to start building the initial model. However, running the algorithm recursively on each detected instance would easily help resolving such scenarios. For instance, some detected repetitive patterns are indicated by oval lines. Since the algorithm of the image processing method searches for the largest repetitive pattern, the object instances occurring in a repetitive way are merged into one object. Another experiment was carried out with multiple instances of two different objects (Crayola and book) per one scene.

Figure 11:
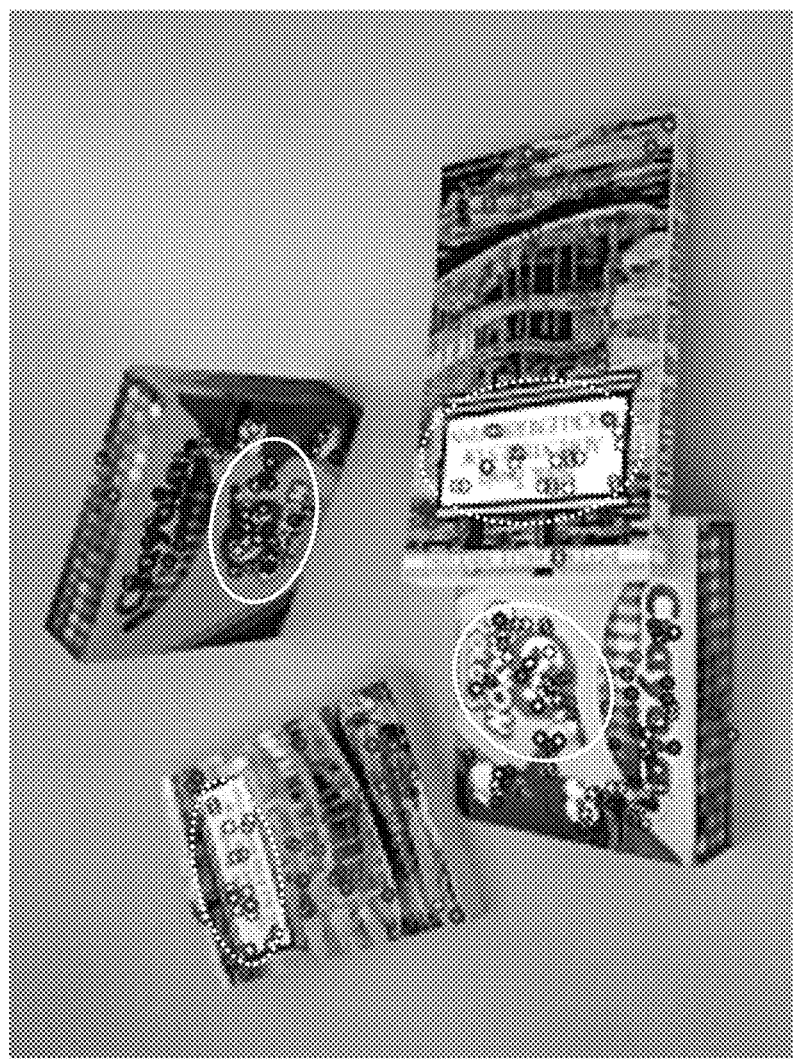
FIG. 11 is an example indicating multiple objects detection and localization in a single frame, according to embodiments of the present invention.

FIG. 11 is an example of multiple objects discovered and localized in a single frame. Instances of the first object are indicated on crayon boxes, instances of the second are indicated on books. In FIG. 11, it is indicated that the two different models were correctly discovered and their respective instances localized. For examples, some instances of the first object (crayon boxes) are indicated by solid oval lines, some instances of the second object (books) are indicated by dashed oval lines, based on the object detection and localization method according to embodiments of the present invention.

As described above, we presented a novel method and an image processing system for 3D discovery, modeling and localization of multiple instances of an object using a single RGB-D image. Following a sparse feature representation, we employ appearance similarity and geometric similarity to group features associated to the instances. Our grouping algorithm is efficient as it considers triplet matches and eliminates incorrect correspondences between triplets based on various geometric constraints. The 6-DOF poses calculated for each triplet match are clustered in order to find matching object instances. The initial model generated using the clustering results can then be used to detect remaining object instances in the scene. Accordingly, the proposed method provides descriptive and compact object models using only a single RGB-D image and is suitable for robotic manipulation tasks.

As discussed above, the initial object model creation depends on the choice of starting point (we chose the largest cluster) during grouping of 6-DOF poses among triplet matches. According to embodiments of the present invention, the algorithm finds the largest repetitive pattern in the scene. This can be an important especially when the objects are placed in an organized way. We can solve this problem by recursively calling the algorithm on the set of points from each cluster.

The image processing method and its function diagrams described above can be stored on a computer readable storage medium including volatile and non-volatile, removable and non-removable media implemented with any technology for the storage of computer readable instructions, data structures, program modules, or other data. The Computer readable storage media include, but is not limited to, random access memory (RAM), read-only memory (ROM), electrically erasable programmable read-only memory (EEPROM), flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described above.

As described above, according to embodiments of the present disclosure, it is possible that querying the training database with the input images can be reduced. Accordingly, the consumptions of the memories, the central processing unit (CPU) usage, power consumption, and/or network bandwidth usage can be reduced.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A computer implemented imaging system, comprising:
at least one camera to acquire an image of a scene including multiple objects of an identical type, wherein the image includes a set of pixels and each pixel includes at least an intensity value and a depth value; a memory to store the image and an image processing program; and a processor, in association with the memory, to execute the image processing program, wherein the program comprises:
an object identifier to cluster a first cluster of first pixels and a second cluster of second pixels among pixels of the image based on appearance similarity and geometric similarity of the first and second pixels so that a single transformation transfers and aligns first positions of the first pixels in a first group to second positions of the second pixels in a second group, respectively, wherein the first group formed by the first pixels of the first cluster matches to the second group formed by the second pixels of the second cluster when a first appearance of any pixel of the first group matches to a second appearance of a pixel of the second group and a first distance between any pair of pixels in the first group matches a second distance between a pair of corresponding appearance matching pixels in the second group, wherein the object identifier groups at least a subset of pixels in the image into a set of groups, wherein each of the groups includes at least three pixels, wherein at least one or more than one pixels belong to multiple groups; comparing features of appearances of the pixels of different groups with each other to form pairs of matching groups, wherein a difference between values of the features representing the appearance of corresponding pairs of pixels from different groups in the pair of matching groups is less than a first threshold; determining a geometric transformation for every matching pair of groups; clustering the pixels of the groups into a set of clusters based on the determined geometric transformation, wherein the single transformation is provided by calculating poses of the matched first and second groups formed by the first and second pixels.

2. The imaging system of claim 1, wherein the program further includes an object locator to determine a first pose of an object represented by the first pixels of the first cluster.

3. The imaging system of claim 1, wherein the first appearance of a first pixel matches the second appearance of a second pixel when a difference between values of features representing the first and the second pixels is less than a first threshold, and wherein the first distance matches the second distance when a difference between the first and the second distances is less than a second threshold.

4. The imaging system of claim 2, further comprising:
a manipulator to manipulate the object at the pose determined by the object locator, wherein at least one camera is arranged at a position on the manipulator or another position separated from the manipulator for detecting a position and a pose of the object.

5. The imaging system of claim 4, wherein the manipulator includes a robotic arm to move the object.

6. The imaging system of claim 4, wherein the manipulator includes a gripper to pick the object.

7. The imaging system of claim 1, wherein a pose is determined based on the transformation between the first and second clusters and the pose includes one or combination of a location of the object and an orientation of the object.

8. The imaging system of claim 1, wherein the object identifier forms the pairs of matching groups by extracting the features from pixels of the subset of pixels of the image; comparing the features of each pair of the pixels in the subset to determine pairs of matching pixels; and forming the pairs of matching groups using different combinations of at least three pairs of matching pixels.

9. The imaging system of claim 8, wherein each the pair of matching groups includes a first group and a second group, and wherein the object identifier clusters the pixels by
determining transformations that transfer and align the features of pixels of the first group with the features of pixels of the second group for at least some pairs of matching groups;
identifying pixels of the first groups and pixels of the second groups of the pairs of matching groups associated with a matching transformation; and
selecting the pixels of the first groups of the pairs of matching groups associated with the matching transformation into the first cluster and selecting the pixels of the second groups of the pairs of matching groups associated with the matching transformation into the second cluster.

10. The imaging system of claim 9, wherein the pixels are determined using a keypoint detector.

11. The imaging system of claim 9, wherein the feature of the keypoint pixel is extracted using a keypoint descriptor such as scale invariant feature transform (SIFT) and speeded up robust feature (SURF).

12. The imaging system of claim 2, wherein the object locator determines a model of the object using the first pixels and determines the pose of the object using the model of the object.

13. The imaging system of claim 12, wherein the object locator fuses the pixels of the first and second clusters to produce the model of the object.

14. The imaging system of claim 1 further includes an object detector based on the generated object model wherein keypoint matching and RANSAC-based registration is performed between the model and the remaining set of image features, that are not included in the model.

15. The imaging system of claim 13, wherein incorrect pixel pairs are filtered out by calculating a difference between point pair features.

16. The imaging system of claim 13, wherein the program further comprises:
- a feature extractor to extract features of the objects in the image based on the intensity values of the pixels;
- a feature pair finder to find feature match pairs of the objects from the extracted features based on an appearance similarity of the extracted features, wherein the appearance similarity is defined by the intensity values of the pixels;
- a triplet generator to generate triplets from the feature match pairs;
- a matching finder to find matched triplets from the generated triplets based on a geometric similarity; and
- a clustering module to cluster sets of the triplet pairs having similar transformations defined by predetermined parameters.

17. The imaging system of claim 16, wherein the geometric similarity is determined based on a 6-degree-of-freedom (6-DOF) transformation.

18. The imaging system of claim 16, wherein the appearance similarity is further defined using a Euclidean distance among the extracted features.

* * * * *